United States Patent
Zhao

(10) Patent No.: US 11,849,399 B2
(45) Date of Patent: *Dec. 19, 2023

(54) METHOD FOR REDUCING POWER CONSUMPTION OF TERMINAL, AND TERMINAL

(71) Applicant: HUAWEI TECHNOLOGIES CO., LTD., Guangdong (CN)

(72) Inventor: Jing Zhao, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/667,816

(22) Filed: Feb. 9, 2022

(65) Prior Publication Data
US 2022/0346020 A1 Oct. 27, 2022

Related U.S. Application Data

(63) Continuation of application No. 16/754,035, filed as application No. PCT/CN2017/106192 on Oct. 13, 2017, now Pat. No. 11,277,798.

(51) Int. Cl.
*G06F 1/3206* (2019.01)
*H04W 52/02* (2009.01)

(52) U.S. Cl.
CPC ...... *H04W 52/0264* (2013.01); *G06F 1/3206* (2013.01)

(58) Field of Classification Search
CPC .......... H04W 52/0264; G06F 1/3206
See application file for complete search history.

(56) References Cited

U.S. PATENT DOCUMENTS 9,292,080 B2   3/2016  Pulapaka et al.
9,690,621 B2   6/2017  Kim et al.
(Continued)

FOREIGN PATENT DOCUMENTS

CN   102098392 A   6/2011
CN   102195304 A   9/2011
(Continued)

OTHER PUBLICATIONS

International Search Report dated Jul. 18, 2018, issued in counterpart application No. PCT/CN2017/106192, with X English translation. (16 pages).

(Continued)

*Primary Examiner* — Gary Collins
(74) *Attorney, Agent, or Firm* — WOMBLE BOND DICKINSON (US) LLP

(57) ABSTRACT

This application discloses a method for reducing power consumption of a terminal, and a terminal, and relates to the field of terminal technologies, to resolve a problem of relatively high power consumption of a terminal caused by a background application program. The method includes: when a background power consumption current value of the terminal is greater than a preset current value, controlling, by the terminal, a target application program, to reduce the background power consumption current value, where the background power consumption current value is a sum of power consumption current values of all background application programs on the terminal. The target application program includes at least one or more of the following application programs: a background application program whose use frequency is lower than a preset frequency threshold, a background application program whose power consumption is greater than a preset power consumption threshold, and a background application program with (Continued)

abnormal power consumption. The method is applicable to a process of controlling a background application program.

20 Claims, 13 Drawing Sheets

(56) References Cited

U.S. PATENT DOCUMENTS

| | | | |
|---|---|---|---|
| 9,690,685 | B2 | 6/2017 | Vyas et al. |
| 2011/0296416 | A1 | 12/2011 | Kim et al. |
| 2012/0260118 | A1* | 10/2012 | Jiang .................... G06F 9/4893 713/340 |
| 2013/0191541 | A1* | 7/2013 | Kishan ................. G06F 9/5011 709/226 |
| 2013/0311803 | A1 | 11/2013 | Wang et al. |
| 2014/0064171 | A1 | 3/2014 | Zhou et al. |
| 2014/0195843 | A1 | 7/2014 | Lai et al. |
| 2015/0277533 | A1 | 10/2015 | Kim et al. |
| 2015/0358810 | A1 | 12/2015 | Chao et al. |
| 2016/0048682 | A1 | 2/2016 | Gou et al. |
| 2016/0299550 | A1* | 10/2016 | Wei ......................... G06F 9/485 |
| 2018/0196695 | A1 | 7/2018 | Du et al. |

FOREIGN PATENT DOCUMENTS

| | | |
|---|---|---|
| CN | 103324519 A | 9/2013 |
| CN | 103500002 A | 1/2014 |
| CN | 104007805 A | 8/2014 |
| CN | 104281510 A | 1/2015 |
| CN | 104298336 A | 1/2015 |
| CN | 104598008 A | 5/2015 |
| CN | 105929925 A | 9/2016 |
| CN | 106155788 A | 11/2016 |
| CN | 106896894 A | 6/2017 |
| JP | 2004240555 A | 8/2004 |
| JP | 2009181366 A | 8/2009 |
| JP | 2012063917 A | 3/2012 |
| JP | 2016115212 A | 6/2016 |

OTHER PUBLICATIONS

Office Action dated Oct. 27, 2020, issued in counterpart CN Application No. 201780094618.0, with English translation (17 pages).

Office Action dated Apr. 25, 2021, issued in counterpart CN application No. 201780094618.0, with English translation. (18 pages).

Office Action dated Apr. 20, 2012, issued in counterpart JP application No. 2020-515649, with English translation. (13 pages).

* cited by examiner

METHOD FOR REDUCING POWER CONSUMPTION OF TERMINAL, AND TERMINAL

CROSS-REFERENCE TO RELATED APPLICATIONS

This application is a continuation of U.S. patent application Ser. No. 16/754,035, filed on Apr. 6, 2020, which is a national stage of PCT/CN2017/106192, filed on Oct. 13, 2017. Both of the aforementioned applications are hereby incorporated by reference in their entireties.

TECHNICAL FIELD

This application relates to the field of terminal technologies, and in particular, to a method for reducing power consumption of a terminal, and a terminal.

BACKGROUND

Currently, a multitasking technology is usually applied to terminals such as mobile phones and tablet computers, so that the terminal can simultaneously run a plurality of different application programs. However, a user often starts a plurality of application programs, and does not close each of the application programs after using the application programs. As a result, a large quantity of application programs remain running in the background. These background application programs occupy memory resources of the terminal, increases power consumption of the terminal, and shortens a battery life of the terminal.

SUMMARY

This application provides a method for reducing power consumption of a terminal, and a terminal, to resolve a problem of relatively high power consumption of a terminal caused by a background application program.

To achieve the foregoing objective, the following technical solutions are used in this application.

According to a first aspect, this application provides a method for reducing power consumption of a terminal, including: when a background power consumption current value of the terminal is greater than a preset current value, controlling, by the terminal, a target application program, to reduce the background power consumption current value, where the background power consumption current value is a sum of power consumption current values of all background application programs on the terminal. The target application program includes at least one or more of the following application programs: a background application program whose use frequency is lower than a preset frequency threshold, a background application program whose power consumption is greater than a preset power consumption threshold, and a background application program with abnormal power consumption.

Because the background power consumption current value can reflect a sum of power consumption of all the background application programs on the terminal, the terminal can determine whether the sum of power consumption of all the background application programs exceeds an expected value, by comparing the background power consumption current value with the preset current value. In this way, when the background power consumption current value is greater than the preset current value (that is, the sum of power consumption of all the background application programs exceeds the expected value), the terminal can learn of this situation in a timely manner, and control the target application program, to reduce the background power consumption current value. Therefore, duration of the situation in which the sum of power consumption of all the background application programs exceeds the expected value is quite short, so that the sum of power consumption of all the background application programs is usually kept below the expected value. Usually, power consumption of the background application program is unnecessary power consumption of the terminal. According to the solution in this application, the sum of power consumption of all the background application programs is usually kept below the expected value, that is, unnecessary power consumption of the terminal is reduced.

It can be understood that the background application program whose use frequency is lower than the preset frequency threshold is an application program that is not frequently used by a user. Usually, such an application program is not an application program that the user wants to keep running in the background. Therefore, controlling such an application program by the terminal usually has no adverse impact on user experience.

It can be understood that the background application program whose power consumption is greater than the preset power consumption threshold is an application program with relatively high power consumption. Therefore, by controlling such an application program, the terminal can reduce power consumption of the terminal in a short time.

Optionally, the background application program with abnormal power consumption is a background application program whose power consumption current value is greater than a corresponding maximum power consumption current value.

In a possible implementation of the first aspect, before the controlling, by the terminal, a target application program, the method further includes: obtaining, by the terminal, a preset rule pushed by a cloud server or generated from local statistics, where the preset rule includes a maximum power consumption current value corresponding to each application program; and identifying, by the terminal according to the preset rule, the background application program with abnormal power consumption from at least one background application program.

Optionally, the target application program further includes a background application program that runs no user-aware task.

Optionally, the user-aware task includes at least any one of the following tasks: a health test task, a file download task, a motion detection task, and an audio playback task.

When a background application program runs no user-aware task, the user cannot know whether the background application program is cleaned. Therefore, cleaning the background application program that runs no user-aware task has no impact on user experience. Therefore, in actual application, the terminal keeps a background application program that runs a user-aware task and cleans a background application program that runs no user-aware task, thereby reducing power consumption of the terminal without affecting user experience.

In a possible implementation of the first aspect, the terminal detects the background power consumption current value at a preset time interval.

In a possible implementation of the first aspect, the terminal displays the background power consumption current value on a screen, so that the user can learn of the background power consumption current value, to clean the background application program in a timely manner.

In a possible implementation of the first aspect, after the controlling, by the terminal, a target application program, the method further includes: if the background power consumption current value is greater than the preset current value, shortening, by the terminal, the preset time interval. This increases frequency at which the terminal controls a background application program, so that the background power consumption current value can be decreased in a short time, thereby reducing power consumption of the terminal.

In a possible implementation of the first aspect, the controlling, by the terminal, a target application program specifically includes: cleaning, by the terminal, the target application program, or restricting, by the terminal, the target application program. Specifically, an optional implementation of restricting, by the terminal, the target application program includes: prohibiting the target application program from using a network connection, blocking a wake-lock of the target application program, or suspending a task of the target application program.

In a possible implementation of the first aspect, before the detecting, by the terminal, the background power consumption current value at a preset time interval, the method further includes: determining, by the terminal, the preset current value based on a current battery level. In some embodiments of this application, the current battery level is positively correlated with the preset current value. In other words, a lower current battery level indicates a smaller preset current value. In this way, when the current battery level is relatively low, the terminal intensifies control on a background application program, so that the background current value is relatively small, thereby reducing power consumption of the terminal.

Optionally, when the terminal is in an active state, the preset current value is a first current value, and when the terminal is in an idle state, the preset current value is a second current value, where the first current value is greater than the second current value.

In a possible implementation of the first aspect, when the background power consumption current value of the terminal is greater than the preset current value, the terminal displays prompt information on the screen, where the prompt information is used to display a prompt for controlling at least one target application program; and in response to detection of an operation performed by the user according to the prompt information, the terminal controls the one target application program.

According to a second aspect, this application provides a terminal, including a processing module, configured to: when a background power consumption current value of the terminal is greater than a preset current value, control a target application program, to reduce the background power consumption current value, where the background power consumption current value is a sum of power consumption current values of all background application programs on the terminal. The target application program includes at least one or more of the following application programs: a background application program whose use frequency is lower than a preset frequency threshold, a background application program whose power consumption is greater than a preset power consumption threshold, and a background application program with abnormal power consumption.

Optionally, the background application program with abnormal power consumption is a background application program whose power consumption current value is greater than a corresponding maximum power consumption current value.

In a possible implementation of the second aspect, a communications module is configured to obtain a preset rule pushed by a cloud server or generated from local statistics, where the preset rule includes a maximum power consumption current value corresponding to each application program. The processing module is further configured to identify, according to the preset rule, the background application program with abnormal power consumption from at least one background application program.

Optionally, the target application program further includes a background application program that runs no user-aware task.

Optionally, the user-aware task includes at least any one of the following tasks: a health test task, a file download task, a motion detection task, and an audio playback task.

In a possible implementation of the second aspect, the processing module is further configured to detect the background power consumption current value at a preset time interval.

In a possible implementation of the second aspect, the terminal further includes a display module. The display module is configured to display the background power consumption current value on a screen.

In a possible implementation of the second aspect, the processing module is further configured to: when the background power consumption current value is greater than the preset current value, shorten the preset time interval.

In a possible implementation of the second aspect, the processing module is specifically configured to clean the target application program or restrict the target application program.

In a possible implementation of the second aspect, the processing module is further configured to determine the preset current value based on a current battery level.

Optionally, when the terminal is in an active state, the preset current value is a first current value, and when the terminal is in an idle state, the preset current value is a second current value, where the first current value is greater than the second current value.

In a possible implementation of the second aspect, the display module is further configured to: when the background power consumption current value of the terminal is greater than the preset current value, display prompt information on the screen, where the prompt information is used to display a prompt for controlling at least one target application program. The processing module is further configured to: in response to detection of an operation performed by a user according to the prompt information, control the at least one target application program.

According to a third aspect, this application provides a terminal, including a display, a processor, a memory, a bus, and a communications interface. The memory is configured to store a computer-executable instruction. The display, the processor, and the memory are connected by using the bus. When the terminal runs, the processor executes the computer-executable instruction stored in the memory, so that the terminal performs the following step: the processor is configured to: when a background power consumption current value of the terminal is greater than a preset current value, control a target application program, to reduce the background power consumption current value, where the background power consumption current value is a sum of power consumption current values of all background application programs on the terminal. The target application program includes at least one or more of the following application programs: a background application program whose use frequency is lower than a preset frequency threshold, a background application program whose power consumption is greater than a preset power consumption threshold, and a background application program with abnormal power consumption.

Optionally, the background application program with abnormal power consumption is a background application program whose power consumption current value is greater than a corresponding maximum power consumption current value.

In a possible implementation of the third aspect, the communications interface is configured to obtain a preset rule pushed by a cloud server or generated from local statistics, where the preset rule includes a maximum power consumption current value corresponding to each application program. The processor is configured to identify, according to the preset rule, the background application program with abnormal power consumption from at least one background application program.

Optionally, the target application program further includes a background application program that runs no user-aware task.

Optionally, the user-aware task includes at least any one of the following tasks: a health test task, a file download task, a motion detection task, and an audio playback task.

In a possible implementation of the third aspect, the processor is further configured to detect the background power consumption current value at a preset time interval.

In a possible implementation of the third aspect, the display is configured to display the background power consumption current value on a screen.

In a possible implementation of the third aspect, the processor is further configured to: when the background power consumption current value is greater than the preset current value, shorten the preset time interval.

In a possible implementation of the third aspect, the processor is specifically configured to clean the target application program or restrict the target application program.

In a possible implementation of the third aspect, the processor is further configured to determine the preset current value based on a current battery level.

Optionally, when the terminal is in an active state, the preset current value is a first current value, and when the terminal is in an idle state, the preset current value is a second current value, where the first current value is greater than the second current value.

In a possible implementation of the third aspect, the display is further configured to: when the background power consumption current value of the terminal is greater than the preset current value, display prompt information on the screen, where the prompt information is used to display a prompt for controlling at least one target application program. The processor is further configured to: in response to detection of an operation performed by a user according to the prompt information, control the at least one target application program.

According to a fourth aspect, this application provides a computer readable storage medium, configured to store a computer software instruction used by the foregoing terminal. When the computer software instruction is run on a computer, the computer is enabled to perform the method for reducing power consumption of a terminal according to any one of the possible implementations of the first aspect.

According to a fifth aspect, this application provides a computer program product including an instruction. When the computer program product is run on a computer, the computer is enabled to perform the method for reducing power consumption of a terminal according to any one of the possible implementations of the first aspect.

For beneficial effects corresponding to the second aspect to the fifth aspect, refer to related descriptions of the first aspect.

DESCRIPTION OF EMBODIMENTS

The following terms "first" and "second" are merely intended for description, and shall not be understood as an indication or implication of relative importance or an implicit indication of a quantity of indicated technical features. Therefore, a feature modified by "first" or "second" may explicitly or implicitly include one or more features. In descriptions of embodiments of this application, "a plurality of" means two or more than two, unless otherwise stated.

Currently, there is a doze mechanism (that is, an Android (Android) 6.0 low power consumption mode), used to control a background application program, to reduce power consumption of a terminal. In the doze mechanism, there are five states of the terminal: active, inactive, idle_pending, idle, and idle_maintenance. The following specifically describes how the terminal switches between the five states.

Figure 1:
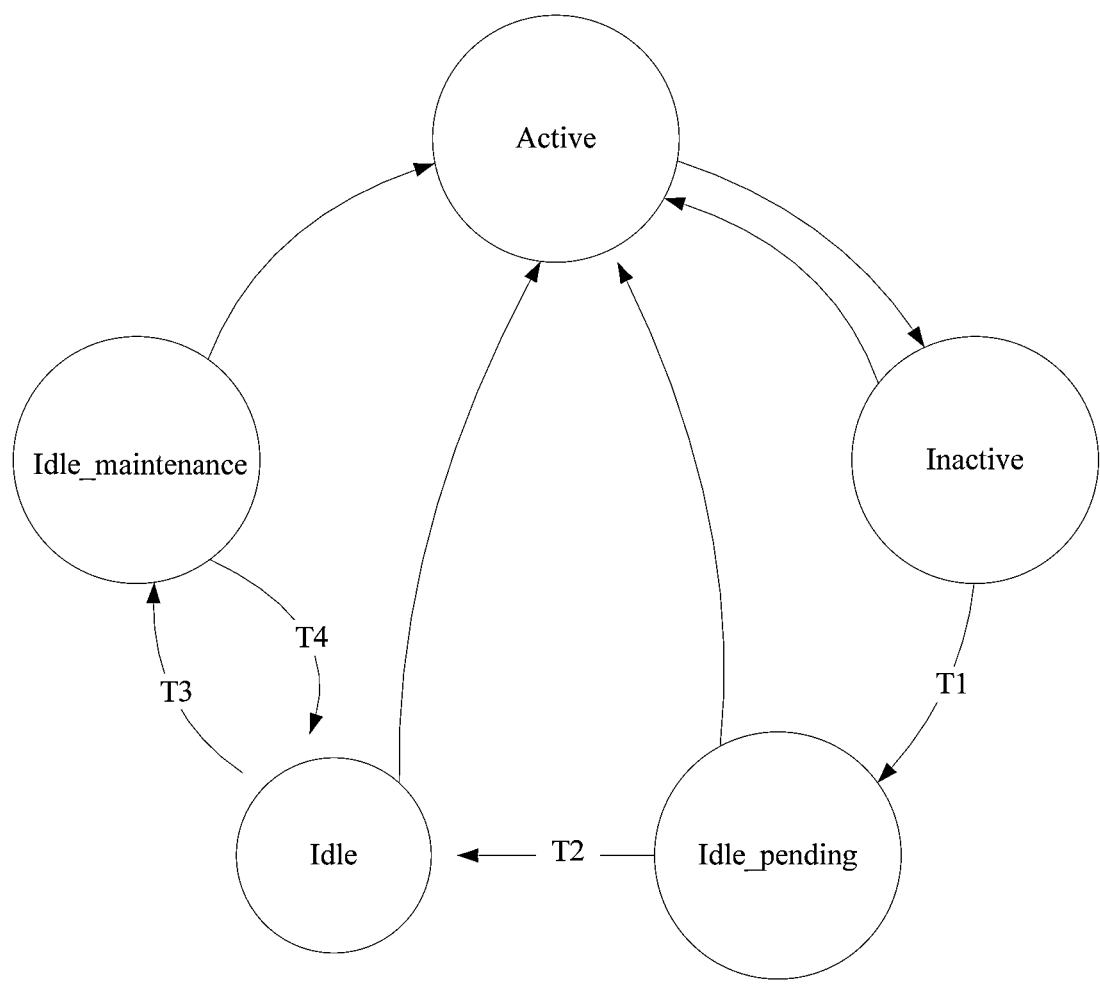
FIG. 1 is a schematic diagram of a doze mechanism.

As shown in FIG. 1, when the terminal is being used or is connected to a power source for charging, the terminal is in the active state. When a screen of the terminal is turned off and the terminal is not being charged, the terminal switches from the active state to the inactive state. If the terminal is not activated in a time T1, the terminal switches from the inactive state into the idle_pending state. After the terminal remains static for a time T2, the terminal switches from the idle_pending state to the idle state.

When the terminal is in the idle state, the terminal controls a background application program, for example, cleans a background application in a non-white list, prohibits a background application program from connecting to a network, blocks a wakelock (Wake Lock) of a background application program, or suspends a task of a background application program, thereby reducing power consumption of the terminal.

In addition, after the terminal is in the idle state for more than a time T3, the terminal may switch to the idle_maintenance state, so that the terminal can perform regular processing on a background application program, for example, allowing a background application program to use a network or processing a suspended task. This process usually lasts for a time T4, and after the time T4, the terminal switches from the idle_maintenance state back to the idle state.

Certainly, when the screen of the terminal is turned on again, regardless of whether the terminal is in the inactive state, the idle_pending state, the idle state, or the idle_maintenance state, the terminal switches to the active state.

Usually, T1 is 30 minutes, T2 is 1 minute, T3 is 30 minutes, and T4 is 30 seconds.

In the foregoing doze mechanism, the terminal can control a background application program only when the terminal is in the idle state, to reduce power consumption of the terminal. However, to switch to the idle state from the active state, the terminal needs to sequentially go through the inactive state and the idle_pending state, and this process requires a period of time (that is, T1+T2, usually 31 minutes). In this period, a background application program continues consuming power, and as a result, power consumption of the terminal is still relatively high. It can be seen that there is a problem of poor timeliness when the doze mechanism is used to control a background application program.

In addition, a condition for the terminal to enter the idle state is relatively strict. That is, the terminal needs to remain static for 1 minute in the idle_pending state. Therefore, an application scenario of the doze mechanism is limited. For example, when a user does exercise, such as running, while carrying a terminal, the terminal cannot remain static, and consequently, the terminal cannot enter the idle state from the idle_pending state, and therefore cannot effectively control a background application program.

To resolve the foregoing problem, the embodiments of this application provide a method for reducing power consumption of a terminal. The method may be applied to any terminal, for example, a mobile phone, a wearable device, an augmented reality (augmented reality, AR) device/a virtual reality (virtual reality, VR) device, a tablet computer, a notebook computer, an ultra-mobile personal computer (ultra-mobile personal computer, UMPC), a netbook, or a personal digital assistant (personal digital assistant, PDA). Certainly, a specific form of the terminal is not limited in the following embodiments.

Figure 2:
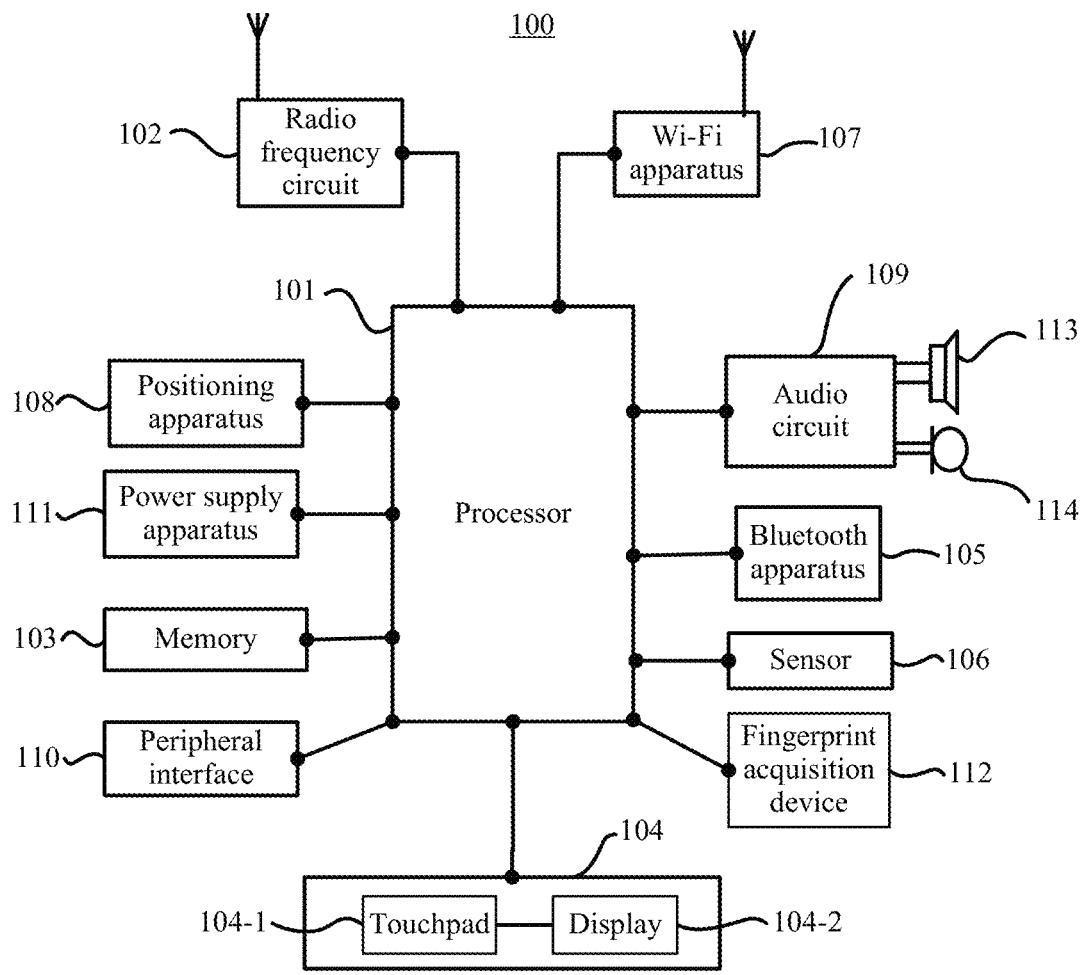
FIG. 2 is a schematic structural diagram of a mobile phone.

As shown in FIG. 2, the terminal in the embodiments of this application may be a mobile phone 100. The following specifically describes an embodiment by using the mobile phone 100 as an example. It can be understood that the mobile phone 100 shown in the figure is merely an example of the foregoing terminal. In addition, the mobile phone 100 may have more or fewer components than those shown in the figure, may combine two or more components, or may have components disposed differently.

As shown in FIG. 2, the mobile phone 100 may specifically include components such as a processor 101, a radio frequency (radio frequency, RF) circuit 102, a memory 103, a touchscreen 104, a bluetooth apparatus 105, one or more sensors 106, a wireless fidelity (wireless fidelity, Wi-Fi) apparatus 107, a positioning apparatus 108, an audio circuit 109, a peripheral interface 110, and a power supply system 111. These components may communicate by using one or more communications buses or signal lines (not shown in FIG. 2). A person skilled in the art may understand that a hardware structure shown in FIG. 2 imposes no limitation on the mobile phone, and the mobile phone 100 may include more or fewer components than those shown in the figure, combine some components, or have components disposed differently.

The following specifically describes each component of the mobile phone 100 with reference to FIG. 2.

The processor 101 is a control center of the mobile phone 100, connects to the components of the mobile phone 100 by using various interfaces and lines, and performs various functions of the mobile phone 100 and processes data by running or executing an application stored in the memory 103 and by invoking data stored in the memory 103. In some embodiments, the processor 101 may include one or more processing units, for example, the processor 101 may be a Kirin 960 chip manufactured by Huawei Technologies Co., Ltd.; in some embodiments of this application, the processor 101 may further include a fingerprint verification chip, configured to verify an acquired fingerprint.

The radio frequency circuit 102 may be configured to receive and send radio signals during information reception and sending or during a call. Particularly, the radio frequency circuit 102 may send, after receiving downlink data from a base station, the downlink data to the processor 101 for processing, and send uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may communicate with another device through wireless communication. The wireless communication may be performed by using any communications standard or protocol, including but not limited to global system for mobile communications, general packet radio service, code division multiple access, wideband code division multiple access, long term evolution, an email, a short message service, and the like.

The memory 103 is configured to store an application and data. The processor 101 performs various functions of the mobile phone 100 and processes data by running the application and data stored in the memory 103. The memory 103 mainly includes a program storage area and a data storage area. The program storage area may store an operating system, and an application required by at least one function (such as an audio playback function and an image playback function), and the data storage area may store data (such as audio data and a phone book) created based on use of the mobile phone 100. In addition, the memory 103 may include a high-speed random access memory (random access memory, RAM), and may further include a nonvolatile memory, for example, a magnetic disk storage device, a flash memory device, or another volatile solid-state storage device. The memory 103 may store various operating systems, for example, an iOS operating system developed by Apple and an Android operating system developed by Google. The memory 103 may be independent and be connected to the processor 101 by using the communications bus. Alternatively, the memory 103 may be integrated with the processor 101.

The touchscreen 104 may specifically include a touchpad 104-1 and a display 104-2.

The touchpad 104-1 may collect a touch event (for example, an operation performed by a user on the touchpad 104-1 or near the touchpad 104-1 by using any proper object, such as a finger or a stylus) of a user of the mobile phone 100 on or near the touchpad 104-1, and transmit collected touch information to another device (for example, the processor 101). The touch event of the user near the touchpad 104-1 may be referred to floating touch control. Floating touch control may mean that the user does not need to directly touch the touchpad to select, move, or drag an object (for example, a widget), but only needs to stay near the terminal to perform a desired function. In addition, the touchpad 104-1 may be implemented in various types, for example, a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form of a liquid crystal display, an organic light-emitting diode, or the like. The touchpad 104-1 may cover the display 104-2. After detecting a touch event on or near the touchpad 104-1, the touchpad 104-1 transmits information about the touch event to the processor 101 to determine a type of the touch event. Then, the processor 101 may provide a corresponding visual output on the display 104-2 based on the type of the touch event. Although the touchpad 104-1 and the display screen 104-2 serve as two independent components in FIG. 2 to implement input and output functions of the mobile phone 100, in some embodiments, the touchpad 104-1 and the display screen 104-2 may be integrated to implement the input and output functions of the mobile phone 100. It can be understood that the touchscreen 104 is made by stacking a plurality of layers of materials. This embodiment of this application shows only the touchpad (layer) and the display screen (layer), and another layer is not described in this embodiment of this application. In addition, the touchpad 104-1 may be disposed on a front side of the mobile phone 100 in a form of a full board, and the display screen 104-2 may also be disposed on the front side of the mobile phone 100 in a form of a full board. In this way, a bezel-free structure can be implemented for the front side of the mobile phone.

In addition, the mobile phone 100 may further have a fingerprint recognition function. For example, a fingerprint sensor 112 may be disposed on a back side of the mobile phone 100 (for example, below a rear-facing camera), or disposed on the front side of the mobile phone 100 (for example, below the touchscreen 104). For another example, a fingerprint acquisition device 112 may be disposed in the touchscreen 104 to implement the fingerprint recognition function. In other words, the fingerprint acquisition device 112 may be integrated with the touchscreen 104 to implement the fingerprint recognition function of the mobile phone 100. In this case, the fingerprint acquisition device 112 is disposed in the touchscreen 104. To be specific, the fingerprint acquisition device 112 may be a part of the touchscreen 104, or may be disposed in the touchscreen 104 in another manner. In this embodiment of this application, a main component of the fingerprint acquisition device 112 is a fingerprint sensor, where the fingerprint sensor may use any type of sensing technology, including but not limited to an optical sensing technology, a capacitive sensing technology, a piezoelectric sensing technology, an ultrasonic sensing technology, or the like.

The mobile phone 100 may further include the bluetooth apparatus 105, configured to implement data exchange between the mobile phone 100 and another short-distance terminal (for example, a mobile phone or a smartwatch). In this embodiment of this application, the bluetooth apparatus may be an integrated circuit, a bluetooth chip, or the like.

The mobile phone 100 may further include at least one sensor 106, for example, a light sensor, a motion sensor, and another sensor. Specifically, the light sensor may include an ambient light sensor and a proximity sensor. The ambient light sensor may adjust luminance of the display of the touchscreen 104 based on brightness of ambient light. The proximity sensor may turn off display power when the mobile phone 100 moves to an ear. As a type of motion sensor, an accelerometer sensor may detect accelerations in various directions (usually three axes), and detect, in a still state, a value and direction of gravity, and may be applied to an application that identifies a mobile phone posture (for example, screen switch between a landscape mode and a portrait mode, a related game, and magnetometer posture calibration), a vibration identification-related function (for example, a pedometer or tapping), and the like. For other sensors such as a gyroscope, a barometer, a hygrometer, a thermometer, and an infrared sensor that may be further configured for the mobile phone 100, details are not described herein.

The Wi-Fi apparatus 107 is configured to provide, for the mobile phone 100, network access in accordance with a Wi-Fi related standard protocol. The mobile phone 100 may access a Wi-Fi access point by using the Wi-Fi apparatus 107, to help the user send or receive an email, browse a web page, access streaming media, and the like. The Wi-Fi apparatus 107 provides wireless broadband Internet access for the user. In some other embodiments, the Wi-Fi apparatus 107 may also be used as a Wi-Fi access point and can provide Wi-Fi network access for another terminal.

The positioning apparatus 108 is configured to provide a geographical location for the mobile phone 100. It can be understood that the positioning apparatus 108 may be specifically a receiver in a positioning system, for example, the global positioning system (global positioning system, GPS), the BeiDou navigation satellite system, and the GLONASS of Russia. After receiving a geographical location sent by the foregoing positioning system, the positioning apparatus 108 sends the information to the processor 101 for processing, or sends the information to the memory 103 for storage. In some other embodiments, the positioning apparatus 108 may be alternatively a receiver in the assisted global positioning system (assisted global positioning system, AGPS). The AGPS acts as an assistant server to assist the positioning apparatus 108 in completing ranging and positioning services. In this case, the positioning assistant server provides positioning assistance by communicating with the positioning apparatus 108 (that is, the GPS receiver) of a terminal such as the mobile phone 100 through a wireless communication network. In some other embodiments, the positioning apparatus 108 may be alternatively a positioning technology based on a Wi-Fi access point. Because each Wi-Fi access point has a globally unique media access control (media access control, MAC) address, the terminal may scan and collect a broadcast signal from a nearby Wi-Fi access point when Wi-Fi is turned on, so as to obtain a MAC address that is broadcast by the Wi-Fi access point. The terminal sends such data that can identify the Wi-Fi access point (such as the MAC address) to a location server through the wireless communication network. The location server retrieves a geographical location of each Wi-Fi access point, calculates a geographical location of the terminal with reference to strength of a Wi-Fi broadcast signal, and sends the geographical location to the positioning apparatus 108 of the terminal.

The audio circuit 109, a loudspeaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for output. In addition, the microphone 114 converts a collected sound signal into an electrical signal, and the audio circuit 109 receives the electrical signal, converts the electrical signal into audio data, and outputs the audio data to the radio frequency circuit 102 for sending the audio data to, for example, another mobile phone, or outputs the audio data to the memory 103 for further processing.

The peripheral interface 110 is configured to provide various interfaces for external input/output devices (for example, a keyboard, a mouse, an external display, an external memory, and a subscriber identity module card). For example, the peripheral interface 110 is connected to a mouse by using a universal serial bus (Universal Serial Bus, USB) interface, and is connected, by using a metal contact on a subscriber identity module card slot, to a subscriber identity module (subscriber identification module, SIM) card provided by a telecommunications operator. The peripheral interface 110 may be configured to couple the foregoing external input/output peripheral devices to the processor 101 and the memory 103.

The mobile phone 100 may further include the power supply apparatus 111 (for example, a battery or a power management chip) that supplies power to each component. The battery may be logically connected to the processor 101 by using the power management chip, so as to implement functions such as charge management, discharge management, and power consumption management by using the power supply apparatus 111.

Although not shown in FIG. 2, the mobile phone 100 may further include a camera (a front-facing camera and/or a rear-facing camera), a flash, a micro projection apparatus, a near field communication (near field communication, NFC) apparatus, and the like. Details are not described herein.

Figure 3:
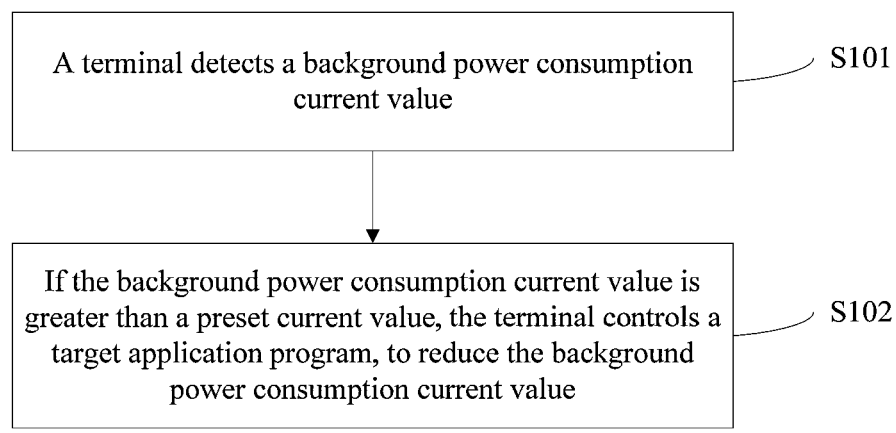
FIG. 3 is a schematic flowchart of reducing power consumption of a terminal according to an embodiment of this application.

The following describes in detail the method for reducing power consumption of a terminal provided in the embodiments of this application, with reference to specific embodiments. As shown in FIG. 3, the method includes the following steps.

S101: The terminal detects a background power consumption current value.

The background power consumption current value is a sum of power consumption current values of all background application programs. A power consumption current value of a background application program is obtained by collecting statistics about power consumption current values of various terminal resources used by the background application program. The terminal resources include a CPU, a memory, a sensor, a network, an audio circuit, and the like.

It should be noted that a background application program is an application program whose interface is not displayed by the terminal. A foreground application program is an application program whose interface is currently displayed by the terminal.

Descriptions are provided with reference to FIG. 2. The terminal may obtain a power consumption current value of each background application program by using the power management chip in the power supply apparatus 111, to obtain the background power consumption current value.

Figure 4:
FIG. 4 is a schematic diagram of a screen on which a terminal displays a power consumption current value.

Optionally, the terminal displays the background power consumption current value on a screen. Referring to FIG. 4, the terminal displays the background power consumption current value in a status bar, so that a user learns of the background power consumption current value, to clean a background application program in a timely manner.

S102: If the background power consumption current value is greater than a preset current value, the terminal controls a target application program, to reduce the background power consumption current value.

It should be noted that the background power consumption current value can reflect a sum of power consumption of all the background application programs on the terminal. Therefore, by detecting the background power consumption current value and comparing the background power consumption current value with the preset current value, the terminal can determine whether the sum of power consumption of all the background application programs exceeds an expected value. In this way, when the background power consumption current value is greater than the preset current value (that is, the sum of power consumption of all the background application programs exceeds the expected value), the terminal can learn of this situation in a timely manner, and control the target application program, to reduce the background power consumption current value. Therefore, duration of the situation in which the sum of power consumption of all the background application programs exceeds the expected value is quite short, so that the sum of power consumption of all the background application programs is usually kept below the expected value. Usually, the sum of power consumption of all the background application programs is unnecessary power consumption of the terminal. According to the solution in this application, the sum of power consumption of all the background application programs is usually kept below the expected value, that is, unnecessary power consumption of the terminal is reduced.

In addition, the preset current value relates to intensity with which the terminal controls a background application program. It can be understood that a smaller preset current value indicates a higher probability that the background power consumption current value is greater than the preset current value. In this case, control intensity of the terminal needs to be enhanced accordingly, so that the background power consumption current value is less than the preset current value.

In actual application, when the terminal is in an active state, it indicates that the user is using the terminal. In this case, most background application programs on the terminal may be application programs that the user needs to use. Therefore, when the terminal is in the active state, the terminal needs to control a background application program with relatively low control intensity, so as to avoid cleaning an application program that the user wants to keep, thereby reducing adverse impact on user experience.

When the terminal is in an idle state, it indicates that the user is not using the terminal. In this case, even if most background application programs are cleaned, user experience is not affected. Therefore, when the terminal is in the idle state, the terminal needs to control a background application with relatively high control intensity, so that only a small quantity of background application programs or no background application programs are kept on the terminal, thereby better reducing power consumption of the terminal.

Optionally, to achieve the foregoing objective, when the terminal is in the active state, the preset current value is a first current value, and when the terminal is in a second work state, the preset current value is a second current value. The first current value is greater than the second current value. For example, when the terminal is in the active state, the first current value is 30 mA, and when the terminal is in the idle state, the second current value is 20 mA.

In an optional implementation, the terminal may set the preset current value to a fixed value, for example, set the preset current value to 20 mA.

In another optional implementation, the terminal may determine the preset current value based on a current battery level. It should be noted that the current battery level may be represented by a percentage of remaining battery power in total battery power. For example, the current battery level is 50%. Descriptions are provided with reference to FIG. 2. The terminal may determine the battery level by using the power management chip in the power supply apparatus 111. Certainly, the battery level may be alternatively determined by using another method. For example, the battery level may be determined by using a voltage testing method, to be specific, the battery level is determined by monitoring a battery voltage and then determining a power change based on a voltage change. Alternatively, the battery level may be determined by using a coulomb counter (coulomb counter). The coulomb counter is an apparatus configured to accurately track a battery power change. This is not limited in this embodiment of this application.

Optionally, the current battery level is positively correlated with the preset current value. In other words, a lower current battery level indicates a smaller preset current value. In this way, when the current battery level is relatively low, the terminal intensifies control on a background application program, so that the background current value is relatively small, thereby reducing power consumption of the terminal.

For example, Table 1 shows an optional implementation of a correspondence between a preset current value and a current battery level.

TABLE 1

| Current battery level | First current value | Second current value |
|---|---|---|
| 60%-100% | 40 mA | 25 mA |
| 30%-60% | 30 mA | 20 mA |
| 0-30% | 20 mA | 15 mA |

Certainly, the correspondence between a preset current value and a current battery level may be alternatively represented in a form of a mathematical formula. This is not limited in this embodiment of this application.

It should be noted that an optional implementation of controlling the target application program by the terminal includes: cleaning the target application program or restricting the target application program. Cleaning the target application program means releasing a memory resource occupied by the target application program, so as to close the target application program. In addition, an optional implementation of restricting the target application program includes: prohibiting the target application program from using a network connection, blocking a wakelock of the target application program, or suspending a task of the target application program.

In this embodiment of this application, the target application program may be determined according to the following rules.

Rule 1: Collect statistics about use frequency of each background application program; and set a background application program whose use frequency is lower than a preset frequency threshold, as the target application program.

The use frequency is a quantity of times the application program is started per unit of time. The unit of time is usually one day or one month. This is not limited in this embodiment of this application.

In this embodiment of this application, the terminal collects, from a startup database, statistics about use frequency of each background application program. The startup database is used to record startup data of each application program. The startup data includes information such as a time and location of each startup of the application program. For example, Table 2 shows use frequency of each background application program on the terminal.

TABLE 2

| Background application program | Use frequency |
|---|---|
| Zhihu | 2 times/day |
| TopBuzz | 4 times/day |
| Baidu Map | 6 times/day |
| Weibo | 10 times/day |
| . . . | . . . |
| WeChat | 25 times/day |

In addition, the preset frequency threshold may be a fixed value preset by the terminal, or may be a dynamic value determined based on the background power consumption current value. In the latter implementation, the background power consumption current value is positively correlated with the preset frequency threshold, in other words, a larger background power consumption current value indicates a larger preset frequency threshold. In this way, more background application programs meet the rule of determining the target application program, so that the terminal controls more background application programs, thereby reducing power consumption of the terminal to a greater extent.

An example is used for description with reference to Table 2. It is assumed that the preset current value is 20 mA, and the preset frequency threshold is 5 times/day when the background power consumption current value is 30 mA, or the preset frequency threshold is 7 times/day when the background power consumption current value is 35 mA. In this case, when the terminal detects that the background power consumption current value is 30 mA, the terminal controls two application programs: Zhihu and TopBuzz; when the terminal detects that the background power consumption current value is 35 mA, the terminal controls three application programs: Zhihu, TopBuzz, and Baidu Map.

Certainly, after statistics about use frequency of all the background application programs are collected, the target application program may be determined by using another implementation. For example, all the background application programs are ranked in ascending order of use frequency, and a preset quantity of background application programs that rank ahead are set as the target application program. This is not limited in this embodiment of this application.

Rule 2: Obtain power consumption of each background application program; and set a background application program whose power consumption is greater than a preset power consumption threshold, as the target application program.

The foregoing power consumption may be total power consumption or average power consumption. Total power consumption herein is an amount of power that has been consumed by an application program since the application program enters the background. Total power consumption is not only related to an average power consumption current of an application program but also related to running duration of the application program in the background, and different application programs enter the background at different times. Therefore, in some cases, power consumption of all the background application programs cannot be accurately compared by using total power consumption of each background application program. In this case, average power consumption may be used for comparison. Average power consumption herein is an amount of power consumed by an application program per unit of time after the application program enters the background, and such power consumption may be obtained by dividing a total amount of power consumed by the application program after the application program enters the background by running duration of the application program in the background.

In this embodiment of this application, the terminal may invoke a corresponding service program in a system to obtain total power consumption and average power consumption of each background application program. Using an Android (Android) system as an example, the terminal may invoke BatteryStatsService to obtain total power consumption and average power consumption of each background application program. For example, Table 3 shows average power consumption of each background application program on the terminal.

TABLE 3

| Background application program | Average power consumption |
| --- | --- |
| WeChat | 53 mAh |
| Zhihu | 46 mAh |
| Weibo | 42 mAh |
| Taobao | 37 mAh |
| Alipay | 30 mAh |
| ... | ... |
| Baidu | 20 mAh |

In addition, the preset power consumption threshold may be a fixed value preset by the terminal, or may be a dynamic value determined based on the background power consumption current value. In the latter implementation, the preset power consumption threshold is negatively correlated with the background power consumption current value, in other words, a larger background power consumption current value indicates a smaller preset power consumption threshold. In this way, more background application programs meet the rule of determining the target application program, so that the terminal controls more background application programs, thereby reducing power consumption of the terminal to a greater extent.

An example is used for description with reference to Table 3. It is assumed that the preset current value is 20 mA, and the preset power consumption threshold is 45 mAh when the background power consumption current value is 30 mA, or the preset power consumption threshold is 40 mAh when the background power consumption current value is 35 mA. In this case, when the terminal detects that the background power consumption current value is 30 mA, the terminal controls two application programs: WeChat and Zhihu; when the terminal detects that the background power consumption current value is 35 mA, the terminal controls three application programs: WeChat, Zhihu, and Weibo.

Certainly, after power consumption of all the background application programs is obtained, the target application program may be determined by using another implementation. For example, all the background application programs are ranked in descending order of power consumption, and a preset quantity of background application programs that rank ahead are set as the target application program. This is not limited in this embodiment of this application.

Rule 3: Set a background application program with abnormal power consumption as the target application program.

Optionally, if a power consumption current value of an application program is greater than a maximum power consumption current value corresponding to the application program, the terminal may determine that the application program has abnormal power consumption.

The terminal may preset a maximum power consumption current value corresponding to each application program, or the terminal obtains a preset rule from a cloud server, where the preset rule includes a maximum power consumption current value corresponding to each application program.

The following specifically describes, with reference to a specific application scenario, a process in which the terminal obtains the preset rule from the cloud server according to this embodiment of this application.

Figure 5:
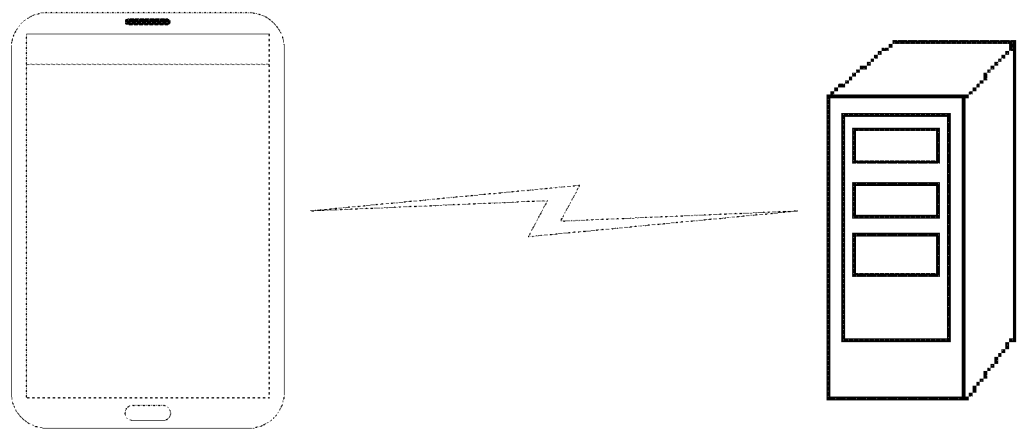
FIG. 5 is a schematic structural diagram of an application scenario according to an embodiment of this application.

In a scenario shown in FIG. 5, the cloud server collects data reported by a plurality of terminals, and generates the preset rule by analyzing and processing the collected data by using a big data analysis method. Then, the cloud server pushes the preset rule to the terminal, so that the terminal can identify, according to the preset rule, the background application program with abnormal power consumption.

Figure 6:
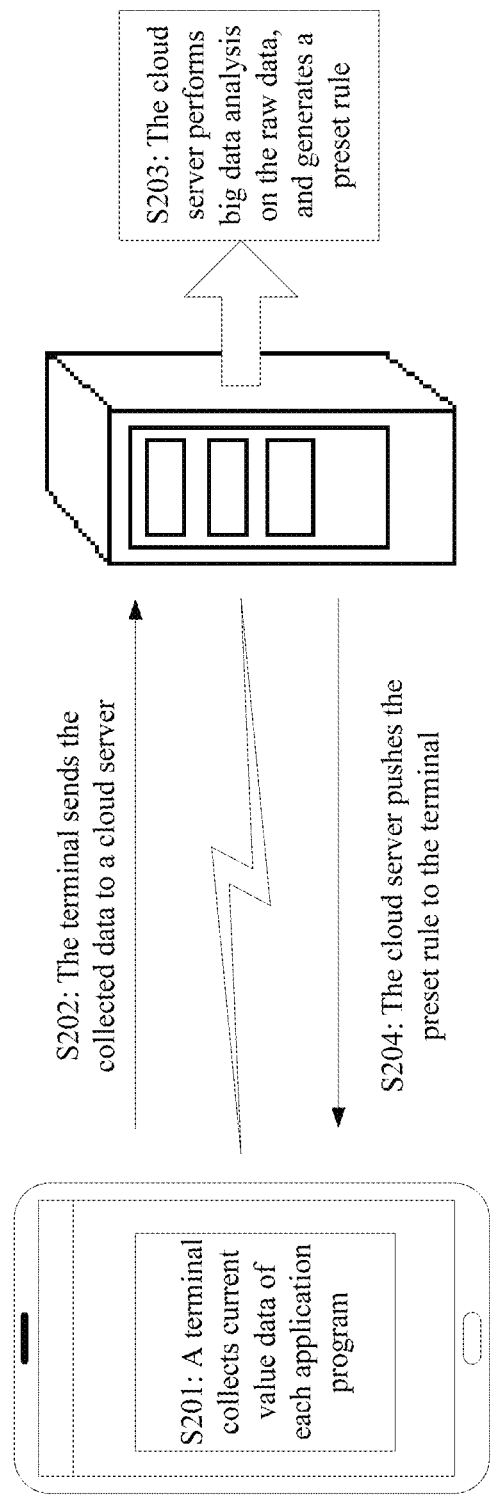
FIG. 6 is a schematic diagram of a process of obtaining a preset rule by a terminal in the application scenario shown in FIG. 5.

For example, referring to FIG. 6, as shown in process 201, the terminal collects power consumption current value data of each application program, where the power consumption current value data includes a power consumption current value of the application program in a running process.

As shown in process 202, the terminal sends the collected data to the cloud server. Likewise, the cloud server may further receive data reported by another terminal. For ease of description, in this embodiment of this application, data reported by each terminal is described as raw data.

As shown in process 203, the cloud server performs big data analysis on the raw data, and generates the preset rule. The following describes, by using an example, how the cloud server determines a maximum power consumption current value corresponding to an application program. The cloud server obtains a maximum value from power consumption current value records of the WeChat application that are reported by all terminals. The cloud server calculates a probability of each value, and selects a value with a largest probability as a maximum power consumption current value corresponding to the WeChat application. For example, a maximum power consumption current value of the WeChat application on most terminals is 5 mA, and in this case, the cloud server determines that the maximum power consumption current value corresponding to the WeChat application is 5 mA. Certainly, the cloud server may alternatively use another method to determine a maximum power consumption current value corresponding to an application program. This is not limited in this embodiment of this application.

For example, Table 4 shows an optional implementation of the preset rule.

TABLE 4

| Application program | Maximum power consumption current value |
| --- | --- |
| WeChat | 5 mA |
| Alipay | 5.3 mA |
| ... | ... |
| Taobao | 7 mA |

Further, because there are hardware and/or software differences between terminals of different models, there is a difference between power consumption current values of an application program on terminals of different models. To make a maximum power consumption current value corresponding to an application program more accurate, the cloud server may take a terminal model into consideration when performing dig data analysis on the raw data. To be specific, the cloud server classifies the raw data, groups data on terminals of a same model into a same type, and analyzes data of each type, to obtain a preset rule corresponding to each terminal model. Table 5 shows an optional implementation of the preset rule.

TABLE 5

| Terminal model | Application program | Maximum power consumption current value |
| --- | --- | --- |
| Huawei P9 | WeChat | 5 mA |
| | Alipay | 5.3 mA |
| | ... | ... |
| | Taobao | 7 mA |
| Xiaomi 4 | WeChat | 6 mA |
| | Alipay | 6.1 mA |
| | ... | ... |
| | Taobao | 7.3 mA |

As shown in process 204, the cloud server pushes the preset rule to the terminal. Optionally, to a terminal of a model, the cloud server pushes a preset rule corresponding to this terminal model only. For example, for a terminal whose model is Huawei P9, the cloud server pushes, to the terminal, a preset rule corresponding to Huawei P9 only. In this way, the terminal identifies, according to the preset rule, the background application program with abnormal power consumption. For example, as shown in Table 4, in the preset rule, the maximum power consumption current value corresponding to the WeChat application is 5 mA, and if the terminal detects that a power consumption current value of the WeChat application that is running in the background is 6 mA, the terminal determines that the WeChat application has abnormal power consumption.

In addition, the cloud server may regularly push the preset rule to the terminal, or may push a new preset rule to the terminal only when the preset rule is updated.

Certainly, whether an application program has abnormal power consumption may be determined by using another implementation. For example, an invocation right is set for each application program, where the invocation right may include a hardware component and an API that can be invoked by the application program. If an application program invokes a hardware component/an API that is not included in an invocation right of the application program, the application program has abnormal power consumption.

It can be understood that the terminal may determine the target application program according to any one or any combination of the foregoing rules.

In addition, in another implementation, the target application program further includes a background application program that runs no user-aware task. The user-aware task includes a health test task, a file download task, a motion detection task, and an audio playback task.

When a background application program runs no user-aware task, the user cannot know whether the background application program is cleaned. Therefore, cleaning the background application program that runs no user-aware task has no impact on user experience. Therefore, in actual application, the terminal keeps a background application program that runs a user-aware task and cleans a background application program that runs no user-aware task, thereby reducing power consumption of the terminal without affecting user experience.

For example, application programs that run in the background of the terminal include WeChat, NetEase Cloud Music, Thunder, Hupu Running, Snail Sleep, and the like. When the user is running, only Hupu Running is used to record parameters such as a running speed and time. That is, only the application program Hupu Running runs a motion detection task, and none of the other application programs runs a user-aware task. Therefore, when the background power consumption current value is greater than the preset current value, the terminal keeps only the application program Hupu Running, and cleans application programs such as WeChat, NetEase Cloud Music, Thunder, and Snail Sleep, so as to effectively control background application programs on the terminal without affecting normal use of the terminal by the user for motion status detection, to reduce power consumption of the terminal. Certainly, if the user uses NetEase Cloud Music to play audio while running, when the background power consumption current value is greater than the preset current value, the terminal does not clean NetEase Cloud Music, but keeps NetEase Cloud Music running in the background, so that the user can listen to music while running.

For another example, application programs that run in the background of the terminal include WeChat, NetEase Cloud Music, Thunder, Hupu Running, Snail Sleep, and the like. When the user is taking a rest, only Snail Sleep is used to detect a heart rate and record a sleep time. That is, only the application program Snail Sleep runs a health test task, and none of the other application programs runs a user-aware task. Therefore, when the background power consumption current value is greater than the preset current value, the terminal keeps only the application program Snail Sleep, and cleans application programs such as WeChat, NetEase Cloud Music, Thunder, and Hupu Running, so as to effectively control background application programs on the terminal without affecting normal use of the terminal by the user for sleep status detection, to reduce power consumption of the terminal.

Figure 7:
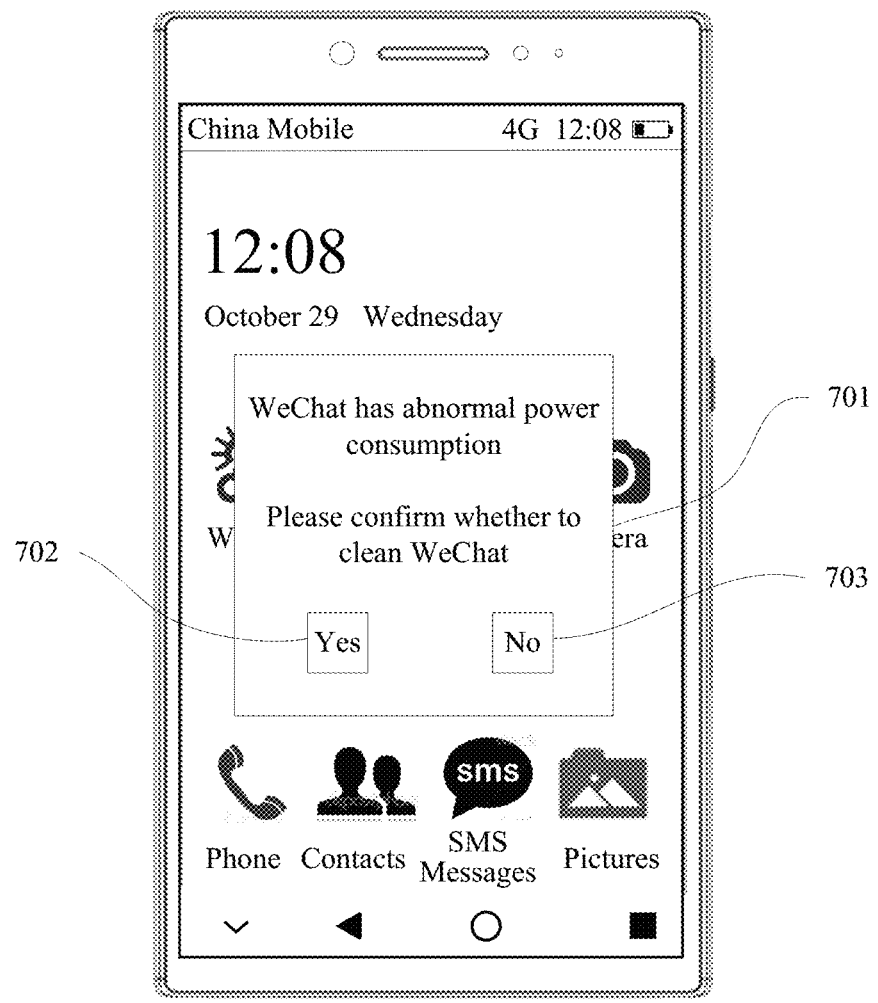
FIG. 7 is a schematic diagram of a screen that displays prompt information when a target application program is being controlled.

In addition, when the target application program is being controlled, to avoid a case in which an application program that the user wants to keep running in the background is controlled, when the background power consumption current value of the terminal is greater than the preset current value, the terminal displays prompt information on a screen, where the prompt information is used to display a prompt for controlling at least one target application program. In response to detection of an operation performed by the user according to the prompt information, the terminal controls the at least one target application program. Referring to FIG. 7, the WeChat application has abnormal power consumption. Before the mobile phone is about to clean the WeChat application, prompt information 701 is displayed. The prompt information is used to inquire of the user whether to clean the WeChat application. The user may tap a button 702 to trigger the mobile phone to clean the WeChat application. Alternatively, the user may tap a button 703, so that the mobile phone keeps the WeChat application.

Figure 8:
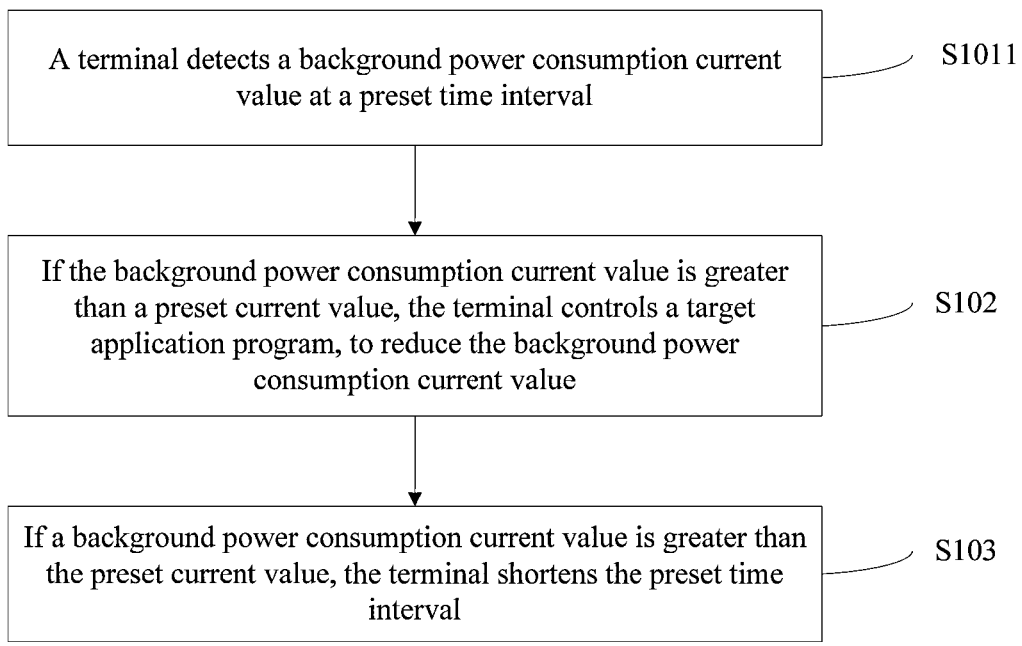
FIG. 8 is another schematic flowchart of reducing power consumption of a terminal according to an embodiment of this application.

It can be understood that during specific implementation, detecting the background power consumption current value by the terminal also needs to consume power of the terminal. Therefore, to further reduce power consumption of the terminal, as shown in FIG. 8, step S101 may be specifically implemented as step S1011.

S1011: The terminal detects the background power consumption current value at a preset time interval.

Optionally, the preset time interval may be set by default or set by the user.

Figure 9A:
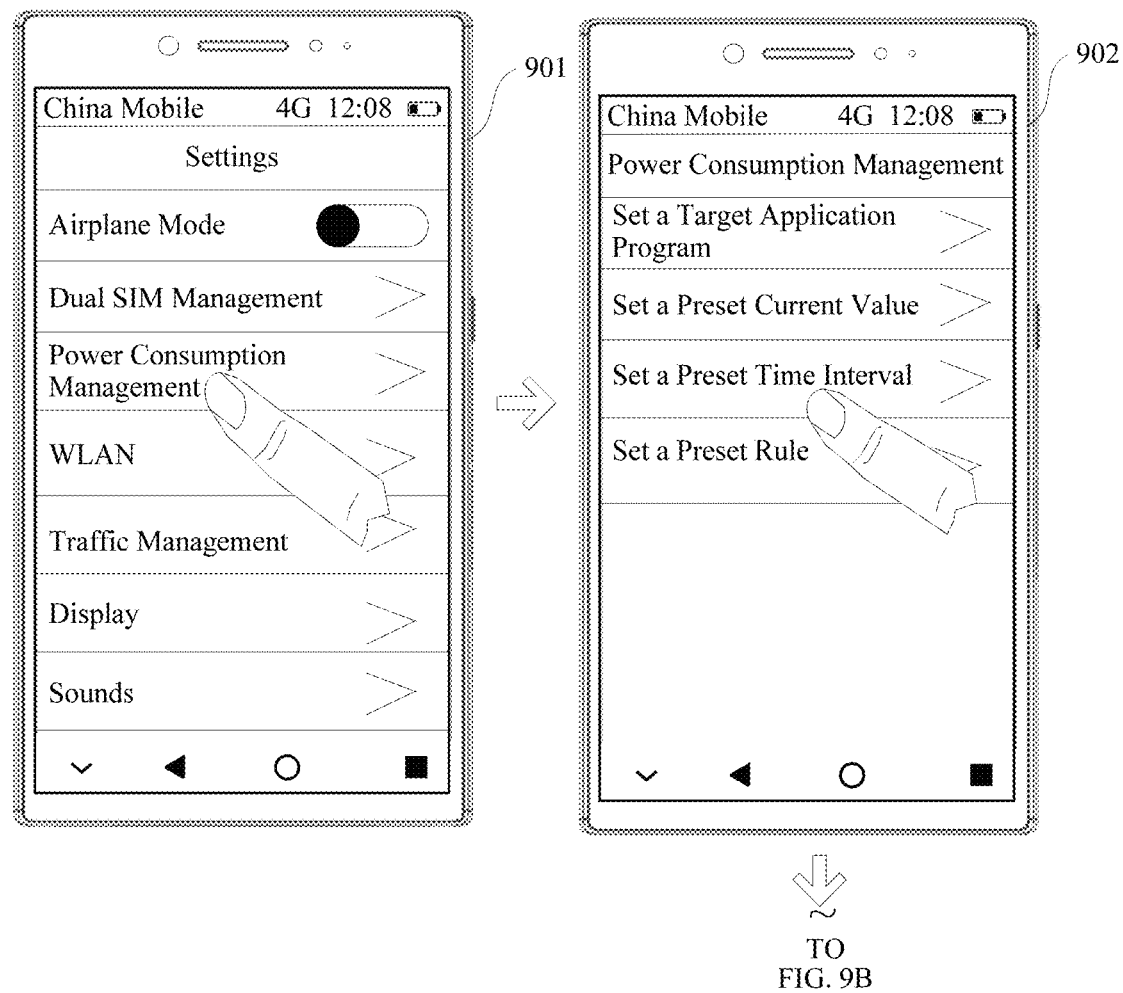
FIG. 9A and FIG. 9B are a schematic diagram of an interface for adjusting a preset time interval.
Figure 9B:
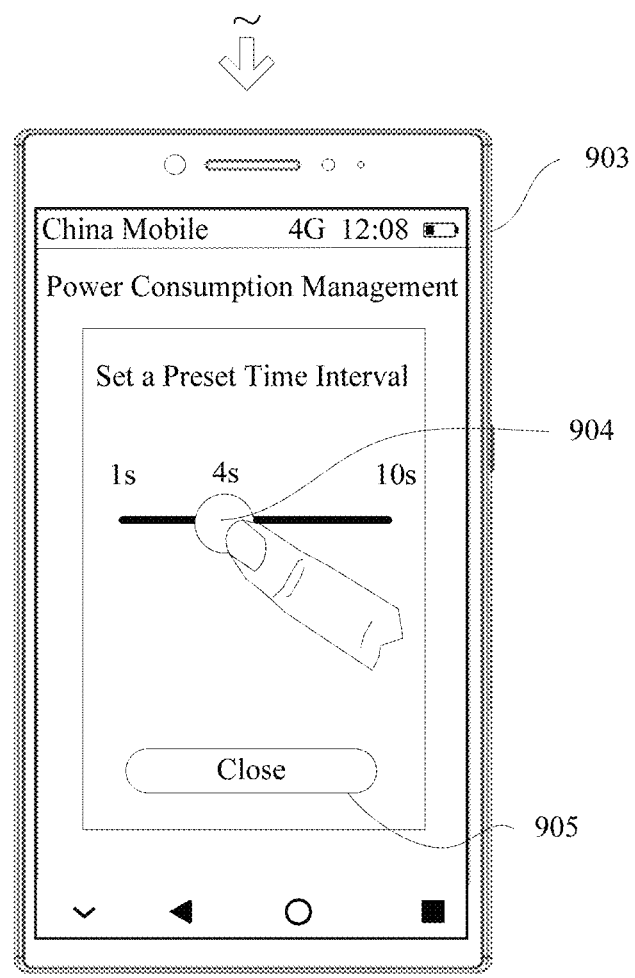

Referring to FIG. 9A and FIG. 9B, the user opens a settings interface 901 of the mobile phone. The interface displays setting operations that can be performed by the user on the mobile phone, for example, whether to turn on an airplane mode, dual SIM management, or power consumption management. After the user selects the option of power consumption management on the settings interface 901, the mobile phone loads an interface 902. Selectable options on the interface 902 include "Set a Target Application Program", "Set a Preset Current Value", "Set a Preset Time Interval", and "Set a Preset Rule". After the user selects the option "Set a Preset Time Interval" on the interface 902, the mobile phone loads an interface 903. There is an adjusting button 904 and a close button 905 on the interface 903. The user slides the adjusting button 904 leftward, thereby triggering the mobile phone to shorten the preset time interval. The user slides the adjusting button 904 rightward, thereby triggering the mobile phone to lengthen the preset time interval. In addition, the user taps the close button 905, thereby triggering the mobile phone to exit the interface 903 and return to the interface 902.

In addition, after step S102, a background power consumption current value may still be greater than the preset current value. In this case, if the preset time interval that is originally set is relatively long, the terminal needs to wait for a relatively long time to control a background application program again. As a result, power consumption of the terminal is relatively high in a relatively long time. Therefore, to resolve this problem, as shown in FIG. 8, the method further includes step S103.

S103: If the background power consumption current value is greater than the preset current value, the terminal shortens the preset time interval.

In this embodiment of this application, the background power consumption current value is negatively correlated with the preset time interval, in other words, a larger background power consumption current value indicates a shorter preset time interval. For example, the preset current value is 30 mA and the preset time interval is 10 s. If the terminal detects that the background power consumption current value is 40 mA, the terminal may adjust the preset time interval to 5 s, so that the terminal detects the background power consumption current value again after 5 s. In this way, when the background power consumption current value is greater than the preset current value, the preset time interval is shortened. This increases frequency at which the terminal controls a background application program, so that the background power consumption current value can be decreased in a short time, thereby reducing power consumption of the terminal.

In this embodiment of this application, the terminal may determine the preset time interval based on a correspondence between the background power consumption current value and the preset time interval; or the terminal substitutes the background power consumption current value into a preset mathematical formula to calculate the preset time interval. This is not limited in this embodiment of this application.

Figure 10:
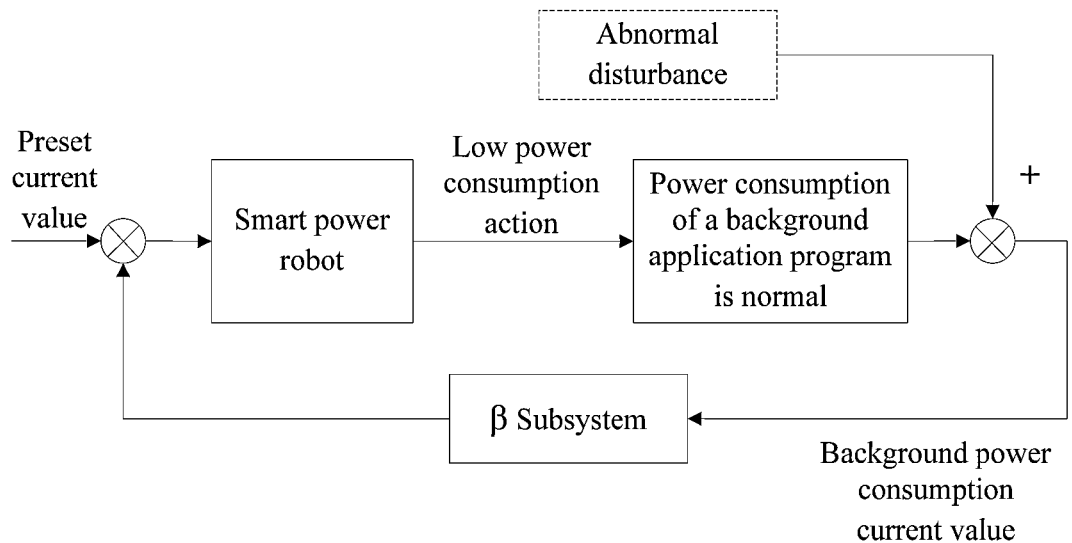
FIG. 10 is a schematic diagram of a negative-feedback system for implementing a method shown in FIG. 8 according to an embodiment of this application.

Referring to FIG. 10, a smart power robot is set in the terminal to control a background application program. The smart power robot is a service process or an application program of the system. The smart power robot regularly detects the background power consumption current value of the terminal, and compares the background power consumption current value with the preset current value. When the background power consumption current value is greater than the preset current value, the smart power robot performs a low power consumption action. The low power consumption action is controlling a background application program, for example, cleaning some application programs, restricting an application program from connecting to a network, or prohibiting an application program from using a memory resource. Optionally, the smart power robot may determine a background application program that needs to be controlled, based on factors such as a use habit of the user (for example, frequency at which the user uses an application program). Alternatively, the smart power robot may determine a background application program that needs to be controlled, by tracking a power consumption status of each background application program (for example, a power consumption current value of the background application program or power consumption of the background application program). Alternatively, the smart power robot identifies, according to a rule generated from local statistics or pushed by the cloud server, a background application program with abnormal power consumption, where the background application program with abnormal power consumption is a background application program that needs to be controlled. In addition, the smart power robot further controls a background application program that runs no user-aware task, to reduce power consumption of the terminal.

After the smart power robot performs the low power consumption action, power consumption of the background application program returns to normal, and the background power consumption current value is reduced. However, in actual application, there may be some abnormal disturbance on the terminal, for example, an operation performed by the user causes a new application program to run in the terminal background. The abnormal disturbance increases the background power consumption current value. When the background power consumption current value is increased to a specific extent (that is, the background power consumption current value is greater than the preset current value), the smart power robot performs the low power consumption action again to reduce the background power consumption current value. In this way, the smart power robot implements negative feedback adjustment on the background power consumption current value, so that the background power consumption current value can be kept below the preset current value, to reduce power consumption of the terminal.

In addition, a β subsystem is further set in the terminal. The β subsystem is a service process of the system, and is used to adjust control frequency of the smart power robot. Optionally, when the background power consumption current value is relatively large, the β subsystem increases the control frequency of the smart power robot. That is, the β subsystem detects the background power consumption current value at a shorter time interval, so that the smart power robot performs a plurality of low power consumption actions in a short time. In this way, the background power consumption current value quickly approaches the preset current value, thereby quickly reducing power consumption of the terminal.

It can be understood that, to implement the foregoing functions, the terminal device includes a corresponding hardware structure and/or software module for performing each function. A person skilled in the art should be easily aware that, with reference to algorithm steps of examples described in the embodiments disclosed in this specification, this application can be implemented in a form of hardware or a combination of hardware and computer software. Whether a function is performed by hardware or by computer software driving hardware depends on particular receivers and design constraints of the technical solutions. A person skilled in the art may use a different method to implement the described functions for each particular receiver, but it should not be considered that the implementation goes beyond the scope of this application.

In the embodiments of this application, function module division may be performed on the terminal according to the foregoing method examples. For example, function modules may be divided in one-to-one correspondence with functions, or two or more functions may be integrated into one processing module. The integrated module may be implemented in a form of hardware, or may be implemented in a form of a software function module. It should be noted that module division in the embodiments of this application is an example, and is merely logical function division. During actual implementation, another division manner may be used.

Figure 11:
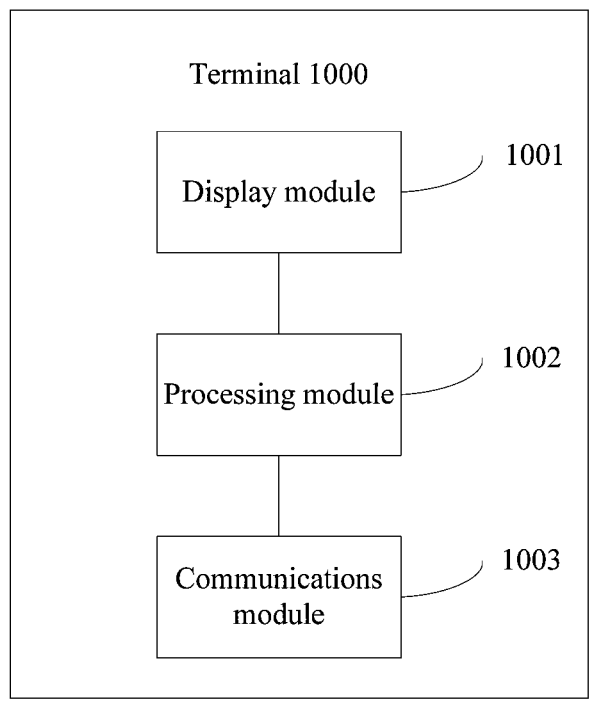
FIG. 11 is a schematic structural diagram of a terminal according to an embodiment of this application.

When function modules are divided in one-to-one correspondence with functions, FIG. 11 is a possible schematic composition diagram of the terminal in the foregoing embodiments. As shown in FIG. 11, a terminal 1000 may include a display module 1001, a processing module 1002, and a communications module 1003.

The processing module 1002 is configured to: when a background power consumption current value of the terminal is greater than a preset current value, control a target application program, to reduce the background power consumption current value, where the background power consumption current value is a sum of power consumption current values of all background application programs on the terminal. The target application program includes at least one or more of the following application programs: a background application program whose use frequency is lower than a preset frequency threshold, a background application program whose power consumption is greater than a preset power consumption threshold, and a background application program with abnormal power consumption.

Optionally, the communications module 1003 is configured to receive a preset rule pushed by a cloud server, where the preset rule includes a maximum power consumption current value corresponding to each application program.

Optionally, the display module 1001 is configured to display the background power consumption current value on a screen.

All related content of the steps in the foregoing method embodiments may be cited in function descriptions of corresponding function modules. Details are not described herein again.

Figure 12:
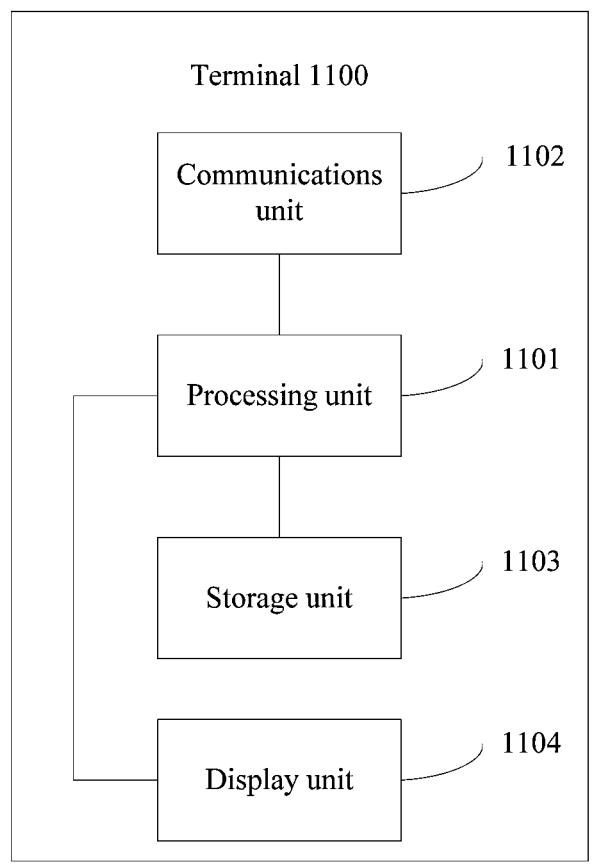
FIG. 12 is a schematic structural diagram of another terminal according to an embodiment of this application.

When an integrated unit is used, FIG. 12 is a possible schematic structural diagram of the terminal in the foregoing embodiments. A terminal 1100 includes a processing unit 1101 and a communications unit 1102. The processing unit 1101 is configured to detect a background power consumption current value, where the background power consumption current value is a sum of power consumption current values of all background application programs on the terminal; and when the background power consumption current value is greater than a preset current value, control a target application program, to reduce the background power consumption current value. The target application program includes at least one or more of the following application programs: a background application program whose use frequency is lower than a preset frequency threshold, a background application program whose power consumption is greater than a preset power consumption threshold, and a background application program with abnormal power consumption. The processing unit 1101 is further used for another process of the technology described in this specification. The communications unit 1102 is configured to support communication between the terminal and another network entity, for example, communication between the terminal and the cloud server shown in FIG. 5. The terminal 1100 may further include a storage unit 1103, configured to store program code and data of the terminal. The terminal 1100 may further include a display unit 1104.

Figure 13:
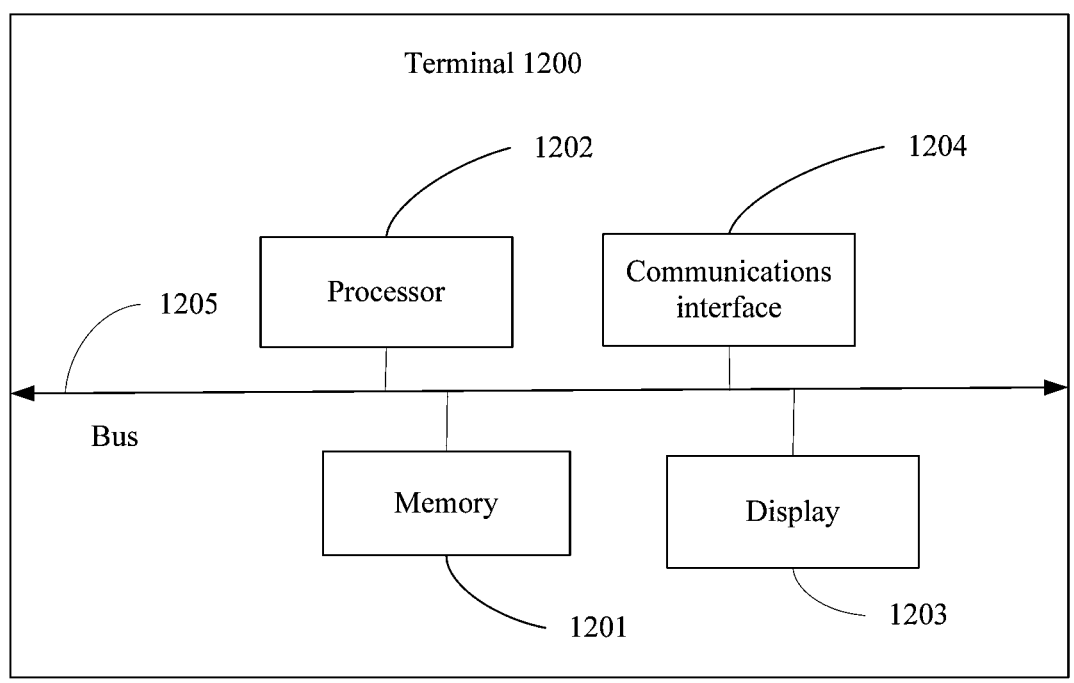
FIG. 13 is a schematic structural diagram of another terminal according to an embodiment of this application.

Referring to FIG. 13, an embodiment of this application further provides a terminal 1200, including: one or more processors 1202, a display 1203, a communications interface 1204, a memory 1201, and a bus 1205. The one or more processors 1202, the display 1203, the communications interface 1204, and the memory 1201 are interconnected by using the bus 1205.

The one or more processors 1202 are configured to: when a background power consumption current value is greater than a preset current value, control a target application program, to reduce the background power consumption current value, where the background power consumption current value is a sum of power consumption current values of all background application programs on the terminal. The target application program includes at least one or more of the following application programs: a background application program whose use frequency is lower than a preset frequency threshold, a background application program whose power consumption is greater than a preset power consumption threshold, and a background application program with abnormal power consumption.

All related content of the steps in the foregoing method embodiments may be cited in function descriptions of corresponding function modules. Details are not described herein again.

One or more programs are stored in the memory 1201. The memory 1201 may mainly include a program storage area and a data storage area. The program storage area may store an operating system, an application program (Application, APP) required by at least one function, and the like. The data storage area may store data created based on use of the terminal 1200 and the like. In addition, the memory 1201 may include a high-speed random access memory, and may further include a nonvolatile memory, for example, at least one magnetic disk storage device, a flash memory device, or another volatile solid-state storage device.

The one or more processors 1202 may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination for implementing a computing function, for example, a combination including one or more microprocessors, or a combination of a DSP and a microprocessor.

The display 1203 may be specifically configured in a form of a liquid crystal display, an organic light-emitting diode, or the like. In addition, a touchpad may be integrated on the display 1203, to collect a touch event on or near the touchpad and send collected touch information to another component (for example, the processor 1202).

The communications interface 1204 is used for mutual communication between the terminal 1200 and another device.

The bus 1205 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 13, but this does not mean that there is only one bus or only one type of bus.

Method or algorithm steps described with reference to the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well known in the art. An example storage medium is coupled to a processor, so that the processor can read information from the storage medium and write information into the storage medium. Certainly, the storage medium may be alternatively a component of a processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, the functions described in this application may be implemented by hardware, software, firmware, or any combination thereof. When software is used for implementation, the functions may be stored in a computer-readable medium, or transmitted as one or more instructions or code in a computer-readable medium. The computer-readable medium includes a computer storage medium and a communications medium, where the communications medium includes any medium that facilitates transmission of a computer program from one place to another. The storage medium may be any available medium that can be accessed by a general-purpose or special-purpose computer.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for reducing power consumption of a terminal, comprising:
   determining, by the terminal, that a background power consumption current of the terminal is greater than a preset value,
   controlling, by the terminal, a target application program to reduce the background power consumption current, wherein the background power consumption current is a sum of power consumption current of all background application programs running on the terminal, and
   wherein the target application program does not comprise a background application program that runs a user-aware task.

2. The method according to claim 1, wherein the preset value is adjusted according to a state of the terminal.

3. The method according to claim 1, wherein the target application program comprises at least one or more of the following application programs:
   a background application program whose use frequency is lower than a preset frequency threshold, a background application program whose power consumption is greater than a preset power consumption threshold, a background application program with abnormal power consumption, or a background application program that runs no user-aware task.

4. The method according to claim 3, wherein the background application program with abnormal power consumption is a background application program whose power consumption current is greater than a corresponding maximum power consumption current.

5. The method according to claim 1, wherein before the controlling the target application program, the method further comprises:
   obtaining, by the terminal, a preset rule pushed by a cloud server, wherein the preset rule comprises a maximum power consumption current corresponding to at least one application program, wherein the preset rule is generated by the cloud server processing data reported by a plurality of terminals; and
   identifying, by the terminal according to the preset rule, the background application program with abnormal power consumption from at least one background application program.

6. The method according to claim 5, wherein obtaining the preset rule pushed by the cloud server comprises:
   obtaining, by the terminal, only a preset rule corresponding to a model of the terminal;
   obtaining, by the terminal, the preset rule regularly; or
   obtaining, by the terminal, a new preset rule only when the preset rule is updated.

7. The method according to claim 1, further comprising:
   detecting, by the terminal, the background power consumption current at a preset time interval; and
   displaying, by the terminal, a value of the background power consumption current on a screen.

8. The method according to claim 7, wherein before detecting the background power consumption current at the preset time interval, the method further comprises:
   determining, by the terminal, the preset value based on a battery level.

9. The method according to claim 8, wherein when the terminal is in an active state, the preset value is a first current value, and when the terminal is in an idle state, the preset value is a second current value, wherein the first current value is greater than the second current value.

10. The method according to claim 1, further comprising:
when the background power consumption current of the terminal is greater than the preset value, displaying, by the terminal, prompt information on a screen, wherein the prompt information is used to display a prompt for controlling at least one target application program; and
in response to detection of an operation performed by a user according to the prompt information, controlling, by the terminal, the at least one target application program.

11. The method according to claim 1, wherein the controlling the target application program comprises:
cleaning, by the terminal, the target application program; or
restricting, by the terminal, the target application program.

12. The method according to claim 11, wherein restricting the target application program comprises:
prohibiting, by the terminal, the target application program from using a network connection;
blocking, by the terminal, a wakelock of the target application program; or suspending, by the terminal, a task of the target application program.

13. The method according to claim 11, wherein the user-aware task comprises at least any one of the following tasks: a health test task, a file download task, a motion detection task, and an audio playback task.

14. The method according to claim 1, further comprising:
detecting, by the terminal, the background power consumption current at a preset time interval.

15. The method according to claim 1, further comprising:
when the background power consumption current is greater than the preset value, shortening, by the terminal, the preset time interval.

16. A terminal, comprising:
a processor; and
a memory configured to store a computer-executable instruction, which when executed by the processor, cause the terminal to perform operations, the operations comprising:
determining that a background power consumption current of the terminal is greater than a preset value,
controlling a target application program to reduce the background power consumption current,
wherein the background power consumption current is a sum of power consumption current of all background application programs on the terminal, and
wherein the target application program does not comprise a background application program that runs a user-aware task.

17. The terminal according to claim 16, wherein the preset value is adjusted according to a state of the terminal.

18. The terminal according to claim 16, wherein the target application program comprises at least one or more of the following application programs:
a background application program whose use frequency is lower than a preset frequency threshold, a background application program whose power consumption is greater than a preset power consumption threshold, a background application program with abnormal power consumption, or a background application program that runs no user-aware task.

19. The terminal according to claim 18, wherein the background application program with abnormal power consumption is a background application program whose power consumption current is greater than a corresponding maximum power consumption current.

20. A non-transitory computer readable storage medium, comprising an instruction, which when executed by a processor, cause the processor to perform operations, the operations comprising:
determining that a background power consumption current of a terminal is greater than a preset value,
controlling a target application program, to reduce the background power consumption current,
wherein the background power consumption current is a sum of power consumption current of all background application programs on the terminal, and
wherein the target application program does not comprise a background application program that runs a user-aware task.

* * * * *